United States Patent [19]

Levan et al.

[11] Patent Number: 5,613,812

[45] Date of Patent: Mar. 25, 1997

[54] ROTARY COOLANT ADAPTOR

[75] Inventors: Clive S. Levan; Clive J. Evans, both of Bristol, Great Britain

[73] Assignee: Bristol Tool & Gauge Engineering Limited, Bristol, Great Britain

[21] Appl. No.: 570,678

[22] Filed: Dec. 11, 1995

[30] Foreign Application Priority Data

Dec. 14, 1994 [GB] Great Britain ............... 9425224

[51] Int. Cl.[6] .................................................. B23C 5/28
[52] U.S. Cl. ........................................... 409/136; 408/56
[58] Field of Search ..................... 279/20; 408/56, 408/57, 59; 409/136

[56] References Cited

U.S. PATENT DOCUMENTS

| 4,598,617 | 7/1986 | Kubo et al. ............... 82/36 R |
| 4,652,189 | 3/1987 | Mizoguchi ................ 409/136 |
| 5,439,333 | 8/1995 | Kubo ....................... 409/136 |

FOREIGN PATENT DOCUMENTS

| 0072657 | 2/1983 | European Pat. Off. . |
| 0095449 | 11/1983 | European Pat. Off. . |
| 0199693 | 10/1986 | European Pat. Off. . |
| 0207031 | 12/1986 | European Pat. Off. . |

*Primary Examiner*—Steven C. Bishop
*Attorney, Agent, or Firm*—Larson and Taylor

[57] ABSTRACT

A rotary coolant adaptor (10) is disclosed comprising:
  (i) a rotatable shaft (4) having at one end a chuck (5) for receiving a tool and at the other end a connection (6) for engaging a machine tool spindle, the rotatable shaft having a bore (8) through which pressurized coolant can be supplied to the tool, one or more inlet(s) in fluid communication with the bore and circumferential grooves provided in the shaft to either side of the inlet(s);
  (ii) a fixed portion locating around the rotatable shaft, the fixed portion having an inlet through which pressurized coolant can be supplied to the inlet(s) in the rotatable shaft; and,
  (iii) sealing means (20) located in the circumferential grooves, the sealing means having first sealing faces (28) for sealing against the shaft and second sealing faces (26) for sealing against the fixed portion of the adaptor,
wherein the pressure of the coolant flowing through the adaptor forces the sealing means (20) to seal against the rotatable shaft and the fixed portion of the adaptor.
The rotary coolant adaptor provides sealing means having a relatively long working life and allows coolant to be supplied at higher pressures.

10 Claims, 3 Drawing Sheets

ROTARY COOLANT ADAPTOR

FIELD OF THE INVENTION

The present invention relates to rotary coolant adaptors, and more particularly to rotary coolant adaptors that are used to supply coolant to operating face of a cutting tool to cool it during use.

BACKGROUND OF THE INVENTION

In a common type of machine tool, a cutting tool is connected to a rotatable drive shaft driven by the machine tool spindle. In many cases, it is desirable to supply coolant to the operating face of the cutting tool to help to cool it during use. Rotary coolant adaptors are used to do this and comprise two main parts; a rotatable shaft provided at one end with a chuck to receive the tool and at the other end with a connection to the machine tool spindle; and a fixed portion that locates around the rotatable shaft and connects to the main body of the machine tool and remains static when the shaft rotates.

The main function of rotary coolant adaptors is to transfer coolant from an inlet on the fixed portion of the adaptor to an inlet on the rotatable shaft of the adaptor, thereby allowing the coolant to pass through a bore in the tool and be ejected through apertures close to or in the operating face of the cutting tool.

As the machine tool spindle rotates at high speed, this can create a large amount of heat at the operating face of the cutting tool. It is therefore necessary to supply a sufficient volume of coolant to the operating face to keep the temperature of the cutting tool within working limits. As this entails using pressurised coolant, it is necessary to provide a seal in the rotary coolant adaptor to help to avoid leakage as coolant passes from the fixed portion of the adaptor to the rotatable shaft.

In the past, rubber lip seals having an edge which abuts the rotatable shaft have been used, these seals locating in housings provided in the fixed part of the adaptor and having edges for sealing against the rotatable shaft. However, these seals suffer from the disadvantage that they wear out quickly as they are pressed against the rotating shaft, which is typically made of metal. Further, the coolant used in such tools is recycled and, although it is often filtered to remove large fragments of waste material, inevitably small fragments remain in the coolant. These help to further abrade these rubber seals, further reducing their life.

In addition, the pressure of coolant that can be supplied through this type of rubber seal is limited, typically to a pressure of around 3.4 MPa (500 lbf/in$^2$). Although in the past this has not been a problem, increasingly modern tools are required to operate at higher rates and/or more intensively, requiring increased flow of coolant to provide the desired cooling effect at the operating face of the cutting tool.

There have been many attempts to increase the pressure of coolant ejected from the rotatable shaft near the tool. However, these attempts have used the known seals and have tried to increase the coolant pressure as it passes through the bore in the shaft. Thus, U.S. Pat. No. 4,652,189 (Mitzoguchi) discloses a conventionally sealed device which relies on a rotor in a chamber in the shaft to increase the feed pressure of the coolant that has already passed into the shaft through the adaptor. Another arrangement is disclosed in U.S. Pat. No. 4,598,617 (Kubo et al) which shows an adaptor having an eccentric rotor in the bore of the rotatable shaft which is driven by the machine tool spindle to create a pumping action to help keep the pressure to the coolant supplied through the shaft constant.

Further, although attempts have been made to replace the rubber seals with seals made from materials having increased frictional wear resistance, eg graphite, none of these attempts has provided a seal having both good wear resistant properties and which is capable of sealing higher pressure systems successfully during long periods of use. There is also an increasing requirement for machine tools to operate under more extreme conditions that require higher coolant flow rates and pressures.

SUMMARY OF THE INVENTION

Accordingly, the present invention provides a rotary coolant adaptor comprising:

(i) a rotatable shaft having at one end a chuck for receiving a tool and at the other end a connection for engaging a machine tool spindle, the rotatable shaft having a bore through which pressurised coolant can be supplied to the tool, one or more inlet(s) in fluid communication with the bore and circumferential grooves provided in the shaft to either side of the inlet(s);

(ii) a fixed portion locating around the rotatable shaft, the fixed portion having an inlet through which pressurised coolant can be supplied to the inlet(s) in the rotatable shaft; and, (iii) sealing means located in the circumferential grooves, the sealing means having first sealing faces for sealing against the shaft and second sealing faces for sealing against the fixed portion of the adaptor, wherein the pressure of the coolant flowing through the adaptor forces the sealing means against the rotatable shaft and the fixed portion of the adaptor.

Thus, in use, the pressurised coolant supplied through the inlet in the fixed portion of the adaptor passes through the inlet(s) and into the bore of the rotatable shaft, and typically passes through bore in the tool to be ejected close to the operating face of the tool to cool it during use.

Further, in contrast to the prior art coolant adaptors, the sealing means are provided in grooves in the rotatable shaft, as opposed to being housed in the fixed part of the adaptor and the pressure of the coolant forces the sealing means into sealing contact with the shaft. Further, the provision of sealing means having sealing faces provides an increased sealing area between the fixed portion of the adaptor and the shaft, allowing coolant to be supplied at greater pressure to the operating face of the cutting tool. Thus, the rotary coolant adaptors of the present invention allow coolant to be supplied to the tool at a high pressure, without the requirement to use complicated pumping devices in the bore of the rotatable shaft to increase the pressure of coolant as it flows through the shaft.

Conveniently, the sealing means are ring shaped, with a gap in the ring to allow them to be easily fitted around the shaft. Preferably, the first sealing faces seal against the walls of the grooves that are longitudinally farthest from the inlet(s), with the second sealing faces for sealing against the adaptor being the radially outermost faces of the sealing means.

Preferably, where the sealing means are located in a groove in the shaft, the sealing means have a generally rectangular cross-section having a first sealing face for sealing against a wall of the groove and a second sealing face for sealing against the adaptor, the planes of the two sealing faces being orthogonal. Where the groove or shaft do not contact the whole of their respective sealing faces, the edge between the sealing faces can be provided with a chamfer to cut away the area of the sealing face(s) that does not make contact. This has the advantage that as the sealing faces wear down, the groove or shaft do not cut a step into the face(s), helping to ensure that the face(s) wear evenly, thereby extending the working life of the sealing means.

Preferably, the sealing means are biased, eg by being radially springy, so that they are held against the fixed portion of the adaptor surrounding the shaft so that the sealing means tend to remain stationary when the shaft rotates. This can be achieved by ensuring that the sealing means are held by a greater force against the fixed portion of the adaptor than against the shaft. This has the advantage of reducing the wear on the first sealing faces. Preferably, the sealing means are made from metal, eg phosphor bronze.

Preferably, the force with which the first faces of the sealing means are held against the rotatable shaft allows small volumes of pressurised coolant to seep under the first sealing faces. The seepage of small volumes of coolant has the advantage of lubricating the first sealing faces which are in contact with the shaft, helping to reduce the rate at which the first sealing faces wear due to contact with the shaft. This may additionally have the advantage of providing a cooling effect to the sealing means, which otherwise might heat up through friction.

Preferably, where the sealing means are biased to contact the fixed portion of the adaptor there are gaps between the sealing means and walls of the circumferential grooves nearest the inlet(s) into which leaking coolant can pass. This coolant will tend to push the sealing means against the fixed portion of the adaptor and/or the rotatable shaft, helping to maintain a good seal.

As some coolant may leak passed the sealing face or a gap provided in the sealing means that allow it to be fitted, it may be desirable to provide a low pressure collection system to collect this coolant to prevent it passing into other parts of the rotary coolant adaptor, eg its bearings, and to allow it to be recycled. The low pressure collection system can conveniently comprise a containment chamber in which coolant leaking passed the sealing means can collect, the chamber being sealed from other parts of the adaptor by low pressure sealing means. The coolant can then escape through an aperture in the chamber and can be carried to a coolant reservoir or other collection vessel or to atmosphere.

Advantageously, the pressure of coolant supplied through the rotary coolant adaptor can be maintained at higher shaft rotation speeds by providing a constriction in the inlet(s) in the rotatable shaft leading to the bore in the through which coolant is supplied to the tool. This maintains the pressure of the coolant supplied through the tool.

In a further aspect, the present invention provides a machine tool connected to or incorporating an adaptor as described above.

BRIEF DESCRIPTION OF THE DRAWINGS

An embodiment of the present invention will now be described by way of example with reference to the accompanying drawings in which.

DETAILED DESCRIPTION

Figure 1:
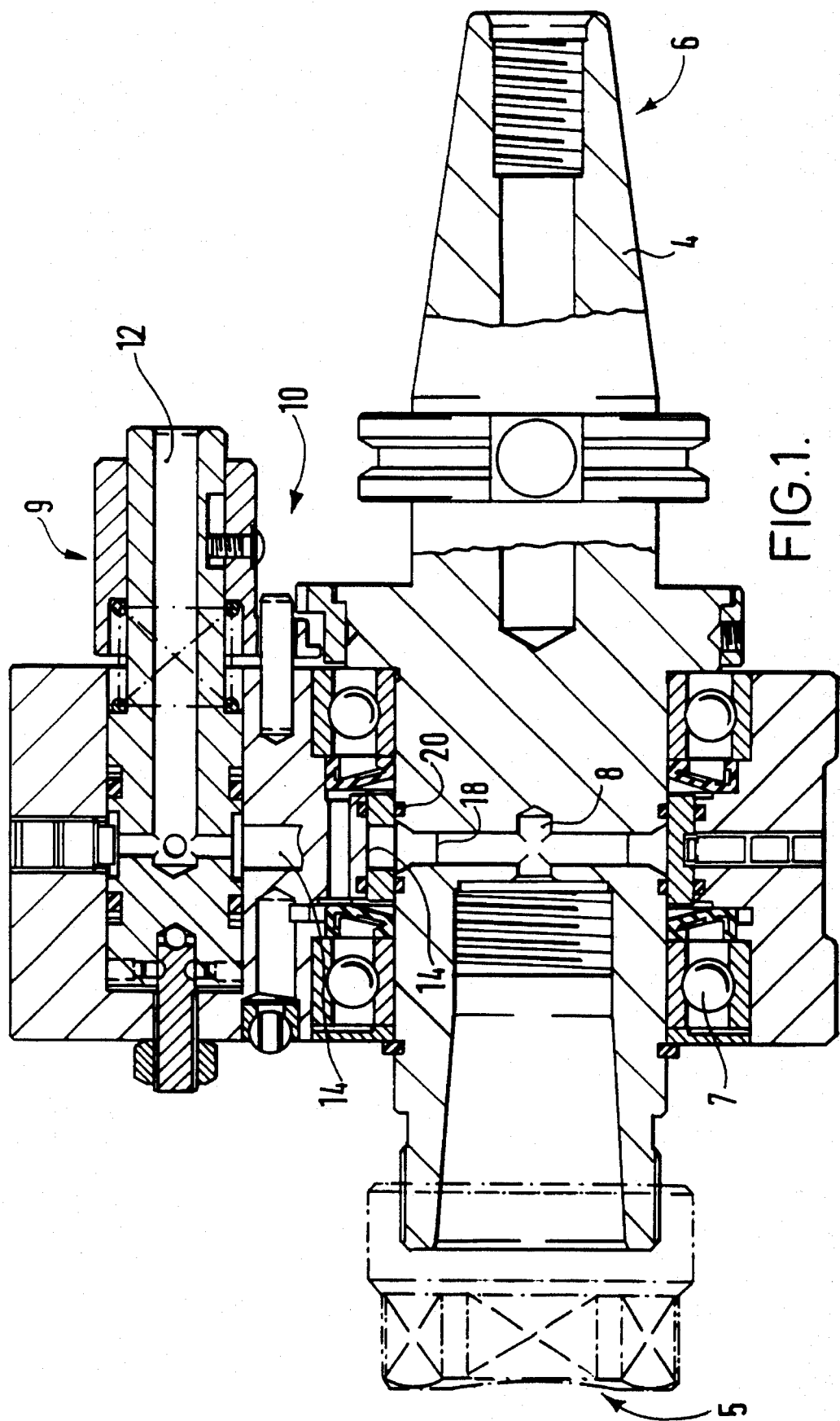
FIG. 1 shows a partial cross-section through a rotary coolant adaptor.
Figure 2:
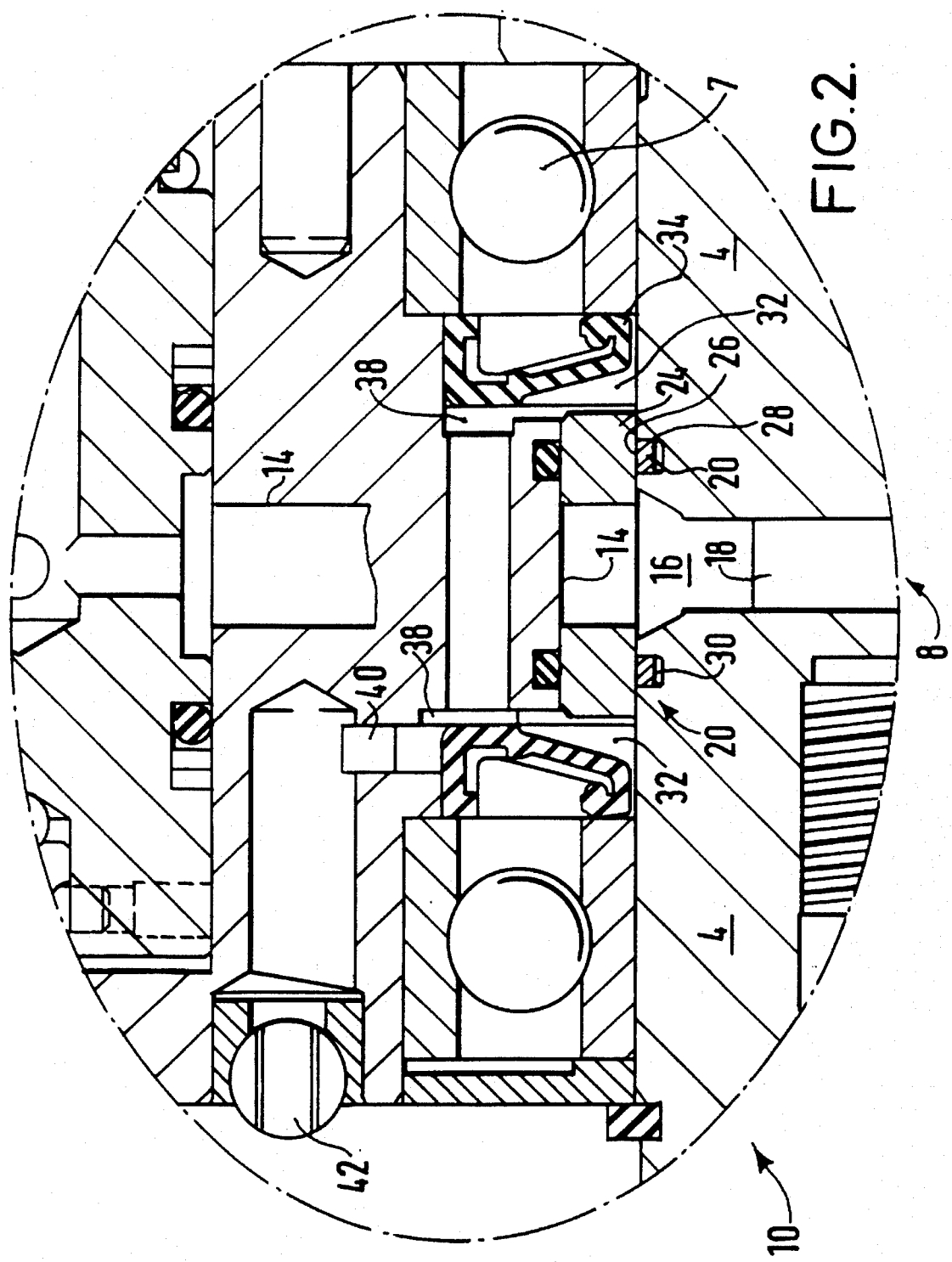
FIG. 2 shows an enlarged cross-section through high and low pressure sealing systems of the adaptor; and, FIG. 3 shows an enlarged cross-section showing the sealing means in detail; and, FIG. 4 shows an enlarged cross-section through an inlet in the rotatable shaft, showing that it reduces in cross-section from the inlet to the bore of the shaft.

Referring to the figures, FIG. 1 shows a rotary coolant adaptor 10 having a rotatable drive shaft 4 with a tapered mounting 6 for connecting to a machine tool spindle and a chuck 5 into which a cutting tool, eg a drill bit, can be attached. The shaft 4 is mounted to a fixed part 9 of the adaptor 10 with bearings 7 to ensure that the shaft can rotate relative to it. When the adaptor 10 is mounted to a machine tool (not shown) inlet 12 can be linked to the coolant supply of the machine tool.

The shaft 4 is provided with an internal bore 8 through which coolant can be supplied through a bore in the tool. Typically, the cutting tool (not shown) has a bore in fluid communication with the bore 8, with coolant supplied through the bores being ejected via apertures close to the operating face of the cutting tool to cool it during use.

Figure 4:
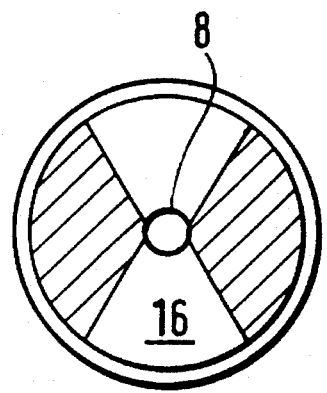

The adaptor 10 supplies pressurised coolant through inlet 12 to outlet 14, from where the coolant passes into high pressure chamber 16. Chamber 16 is formed as the shaft 4 has a circumferential groove cut into it adjacent the outlet 14. Inlets 18 run from the high pressure chamber 16 to join bore 8, allowing the passage of coolant through the bore and thence to the operating face of the tool. FIG. 4 shows that the high pressure chamber 16 has a cross-section which reduces in the direction of coolant flow, thereby increasing the pressure of the coolant supplied through bore 8.

The fixed portion 9 of the adaptor 10 is sealably connected to the shaft 4 by sealing means 20. The sealing means 20 are located in grooves 22 running around the circumference of the shaft 4 to either side of the area where the outlet 14 meets the high pressure chamber 16. The portion of the fixed portion 9 adjacent the high pressure chamber 16 is reinforced by a steel housing 24. The sealing means 20 are phosphor bronze rings that locate in the grooves 22 sealing the steel housing of the adaptor 10 to the rotatable shaft 4. The sealing means 20 have a small gap of about 50 μm to allow them to be easily fitted around the shaft 4 and are radially springy. This biases the sealing means 20 so that their second sealing faces 26 are held against the steel housing 24 by a greater force than their first sealing faces 28 are against the shaft 4. This means that when the shaft rotates, the sealing means 20 tend to be held stationary, rather than rotating with the shaft.

As the sealing means 20 are radially biased as described above, this leaves a small gap 30 in the bottom of groove 22 between the sealing means 20 and the shaft 4. Thus, a small amount of coolant can permeate past the first sealing faces 28 lubricating the interface between the first sealing face and the shaft. This is found to reduce the wear on the sealing means 20, prolonging their working life and providing a cooling effect. The pressurised coolant in entering the gaps 30 also helps to maintain the seal between the shaft 4 and the fixed part 9 of the adaptor 10 by forcing the sealing means 20 radially outwards and longitudinally away from the high pressure chamber 16.

If coolant permeates past the first sealing faces 28, it is important to contain and recycle it to avoid damaging other parts of adaptor 10, eg bearings 7. The adaptor 10 is therefore provided with a low pressure containment system having low pressure chambers 32 in which coolant can collect, each chamber 32 provided with a rubber seal 34, the seal 34 being sprung to prevent coolant reached bearings 36. The low pressure chambers 32 have pipes 38 through which coolant can flow, linking up with a second pipe 40, leading to a bleed 42. Coolant can therefore pass out of the bleed and be collected and/or recycled.

Figure 3:
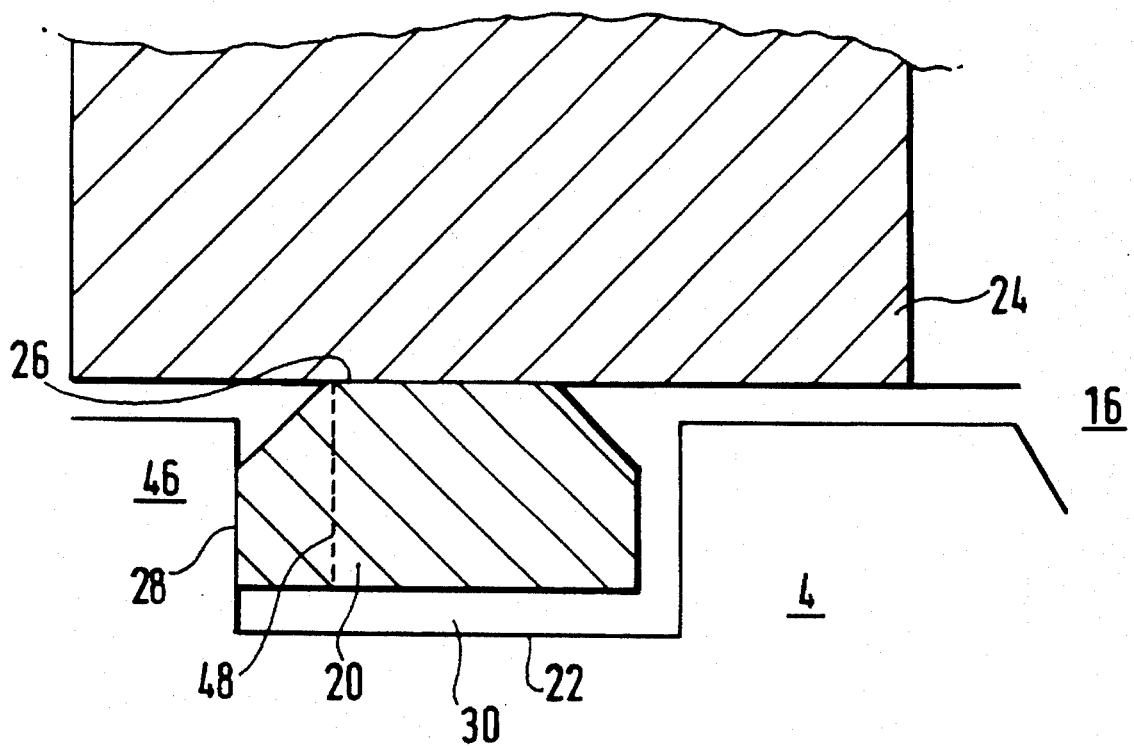

FIG. 3 shows an enlarged view of the sealing means 20 which have a generally rectangular cross-section with the planes of the two sealing faces 26, 28 being orthogonal. However, the sealing means 20 have a chamfer 44 cut into the edge of the sealing means 20 where the first and second sealing faces 26, 28 intersect. This ensures that the whole of the first sealing face 28 contacts the wall 46, ie there is no part of the first sealing face 28 that is not being worn by the wall 46. This extends the working life of the sealing means 20 by delaying point at which wall 46 cuts a step into the sealing means 20 until the first face 28 has worn as far as line 48.

In tests, the adaptor of the present invention was able to deliver coolant at a pressure of 102 MPa (1500 lbf/in$^2$), approximately three times the pressure achievable with conventional rubber seals. In addition, from tests it is estimated that the operating life of the sealing means based on the use of the machine tools for 1 hour per 8 hour shift would be in excess of 9 months.

We claim:

1. A rotary coolant adaptor comprising:
   (i) a rotatable shaft having at one end a chuck for receiving a tool and at the other end a connection for engaging a machine tool spindle, the rotatable shaft having a bore through which pressurised coolant can be supplied to the tool, one or more inlet(s) in fluid communication with the bore and circumferential grooves provided in the shaft to either side of the inlet(s);
   (ii) a fixed portion locating around the rotatable shaft, the fixed portion having an inlet through which pressurised coolant can be supplied to the inlet(s) in the rotatable shaft; and,
   (iii) sealing means located in the circumferential grooves, the sealing means having first sealing faces for sealing against the shaft and second sealing faces for sealing against the fixed portion of the adaptor,
   wherein the pressure of the coolant flowing through the adaptor forces the sealing means against the rotatable shaft and the fixed portion of the adaptor.

2. A rotary coolant adaptor according to claim 1 wherein the sealing means are ring shaped, with a gap in the ring to allow them to be fitted around the shaft.

3. A rotary coolant adaptor according to claim 1 wherein the first faces of the sealing means are held against the rotatable shaft with a force such that small volumes of pressurised coolant can seep under the first sealing faces, lubricating the first sealing faces where they contact the rotatable shaft.

4. A rotary coolant adaptor according to claim 3 further comprising a low pressure collection system to collect coolant seeping under the sealing means.

5. A rotary coolant adaptor according to claim 1 wherein the inlet(s) in the rotatable shaft have constriction(s), the constriction(s) increasing the pressure of the coolant supplied through the inlet(s) to a bore in the tool.

6. A rotary coolant adaptor according to claim 1 wherein the sealing means are located in a groove in the rotatable shaft, the sealing means having a generally rectangular cross-section, with the first sealing faces sealing against a wall of the groove and the second sealing faces sealing against the fixed portion of the adaptor.

7. A rotary coolant adaptor according to claim 6 wherein an edge between the sealing faces is provided with a chamfer.

8. A rotary coolant adaptor according to claim 1 wherein sealing means are radially biased so that they are held against the fixed portion of the adaptor surrounding the shaft so that the sealing means tend to remain stationary when the shaft rotates.

9. A rotary coolant adaptor according to claim 1 wherein the sealing means are made from a phosphor bronze.

10. A machine tool connected to or incorporating a rotary coolant adaptor as described in claim 1.

* * * * *